M. E. FERNALD.
AUTOMATIC MACHINE.
APPLICATION FILED AUG. 16, 1913. RENEWED MAR. 11, 1918.

1,328,144.

Patented Jan. 13, 1920.

Witnesses,
Roswell F. Hatch
William F. Torrey

Inventor,
Mark E. Fernald
by Charles W. McDermott
his attorney

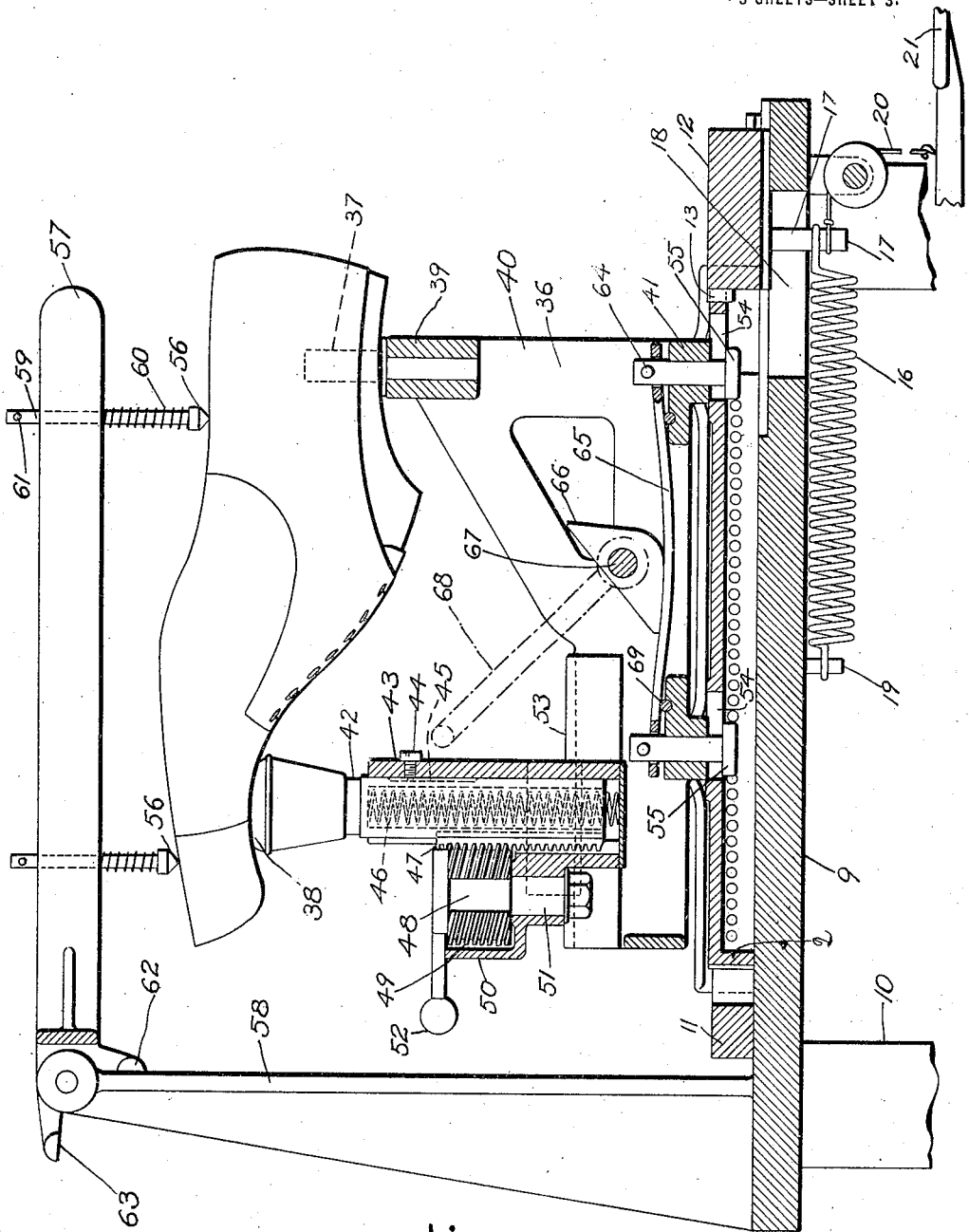

UNITED STATES PATENT OFFICE.

MARK E. FERNALD, OF SAUGUS, MASSACHUSETTS.

AUTOMATIC MACHINE.

1,328,144.     Specification of Letters Patent.     Patented Jan. 13, 1920.

Application filed August 13, 1913, Serial No. 785,079. Renewed March 11, 1918. Serial No. 221,866.

*To all whom it may concern:*

Be it known that I, MARK E. FERNALD, a citizen of the United States, residing at Saugus, in the county of Essex and State of Massachusetts, have invented a new and useful Improvement in Automatic Machines, of which the following is a specification.

The present invention relates to automatic machines and more particularly to automatic machines used in the manufacture of boots and shoes.

As well known to those skilled in the art automatic shoe machines are usually provided with mechanism for relatively actuating the tools and the work to transfer the points of operations of the tools around the work and for relatively shifting the tools and the work laterally as the points of operations of the tools are transferred around the work to maintain the edge of the work adjacent the operating tools in the line of feed. In these machines it is necessary that the work be initially positioned in the machine in proper relation to the operating tools and the mechanism for controlling the relative traverse of the work and tools so that the mechanism may operate at the proper times to relatively swing the work and the tools in the right direction and to the desired extent to maintain the edge of the work adjacent the tools in the line of feed.

The object of the present invention is the provision of simplified and improved means for positioning work relatively to the operating tools of an automatic machine in which the relative traverse of the tools and the work is controlled by a leader.

To the accomplishment of this object the features of the present invention consist in the methods hereinafter described and then particularly pointed out in the appended claims.

The various features of the present invention will be best understood from an inspection of the accompanying drawings illustrating the best form of apparatus for practising the invention at present devised, in which, Figure 1 is a plan of the marking devices for marking the clamped sole;

Fig. 5 is a sectional elevation of the work support positioned on the leader with the pointers registering with the marks on the sole.

In one type of automatic shoe machine the relative movement of the work and the tool, or tools, that operates on the work is controlled by a leader or pattern plate having an outline corresponding to the path which the tools are to traverse on the work. Inasmuch as nearly all the more important marking operations require the tools to operate along a path in or parallel to the edge or margin of the shoe sole the leader usually must have a contour like the outline of a shoe sole. The usual arrangement requires the supporting of the last, sole, shoe, or other article of work having a sole-shaped contour, on a jack to which the leader also is secured, and mechanism is employed that acts through the leader to feed the work past the tools that are to operate on it. Since the tools are compelled to follow substantially the outline of the leader, it obviously is very important to have the work accurately located with reference to the leader. Usually the work is superposed on the leader and the work should be so positioned that its sole-shaped outline or contour if projected on the plane of the leader would coincide with or be concentric with the outline or contour of the leader. The peculiar shape of the work and leader, the fact that they both have lateral reverse curves in their outlines, and that the work is curved longitudinally as well as laterally while the leader is flat, makes the problem of correctly positioning the work with reference to the leader a peculiarly difficult one. The present invention provides a novel method that solves this problem.

Figure 4:
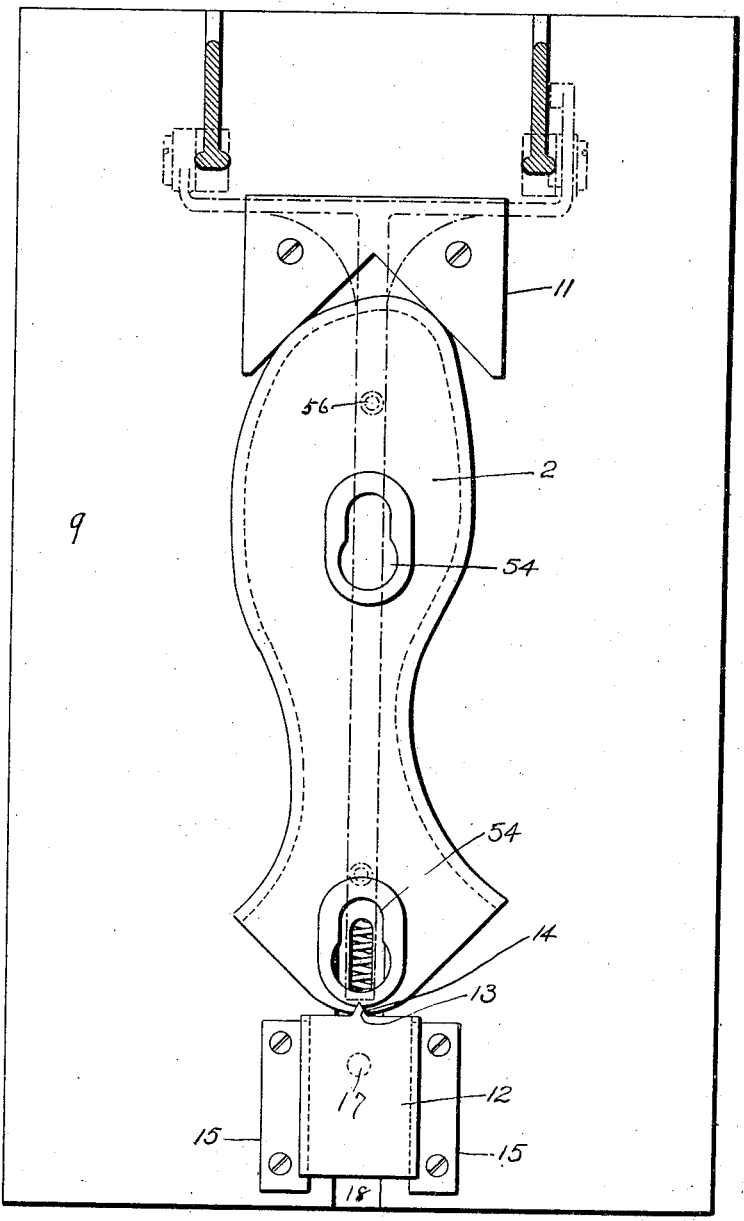
Fig. 4 is a plan, partly in section, of the clamped leader the pointers being indicated in dot and dash lines.

In the illustrated apparatus the sole 1, which it is desired to position relatively to the operating tools of an automatic machine in which the relative traverse of the tools and the sole is controlled by a leader 2 (Figs. 4 and 5), is placed in a holder 3. This holder 3 is provided with a flat base 4 which supports the grain surface of the sole and a pair of V-shaped plates 5 and 6 which engage respectively the fore and heel parts of the sole. The plate 5 is rigidly secured to the base 4. The plate 6 is provided with a tongue 7 which loosely engages a groove 8 formed in the base 4 so that the plate 6 may be positioned different distances from the plate 5 to accommodate the holder to different lengths of soles.

The leader 2 having a contour corresponding to the sole is removed from the automatic machine and placed in a holder or gage 9 mounted on legs 10, (Fig. 5). In order to clamp the leader in the same manner on the holder 9 as the sole is clamped on the holder 3 the holder 9 is provided with a V-shaped plate 11, (Fig. 4) rigidly secured to the holder arranged to engage the fore part of the leader and a block 12 provided with a lug 13 arranged to engage a slot 14 formed on the heel part of the leader. The block 12 is grooved on its longitudinal edges so that it may slide in ways formed in blocks 15 secured to the holder. The block 12 is normally actuated in a direction to engage the lug 13 with the slot 14 by a coiled spring 16, (Fig. 5) one end of which is secured to a pin 17, carried by the block 12 and arranged to work in a slot 18 formed in the holder, and the other end of which is secured to a pin 19 secured to the holder 9. In order to permit the easy insertion of the leader into and its removal from the holder the pin 17 is connected through a rope 20 to a treadle 21 suitably pivoted to the legs 10 by means of which the operative may disengage the lug 13 from the slot 14.

Figure 1:
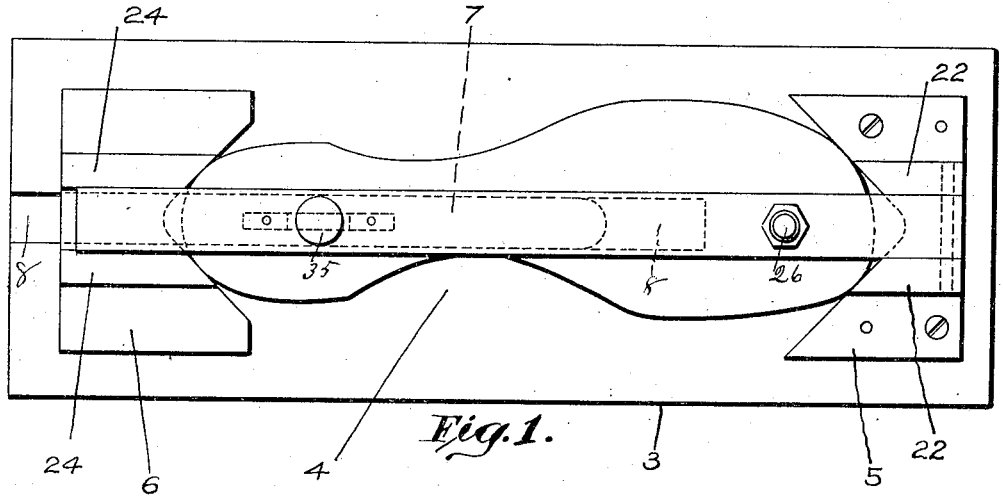
Figure 2:
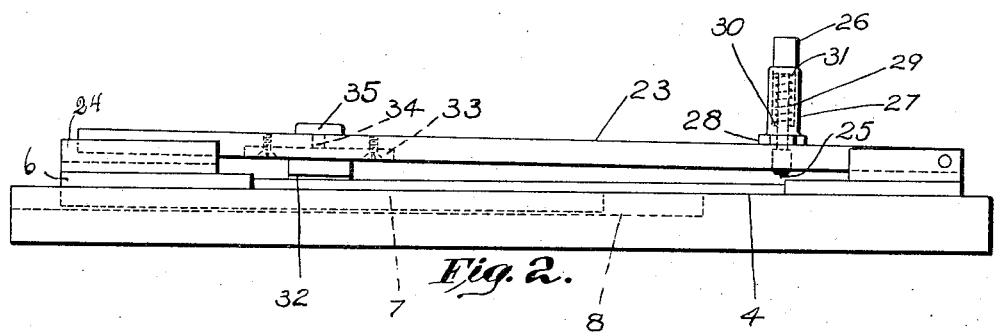
Fig. 2 is a side elevation thereof.

In order to mark the sole the plate 5 carries a pair of lugs 22 between which is pivoted one end of a bar 23, extending longitudinally of the holder 3, the rear end of which passes loosely between a pair of blocks 24 secured to the plate 6. The bar 23 carries a prickpunch 25 (Fig. 2) arranged to mark the forepart of the sole. The prickpunch is formed on the lower end of a pin 26 loosely mounted in a thimble 27 threaded into the bar 23 and locked therein by a lock nut 28. The prickpunch 25 is normally held in an elevated position by a spring 29 coiled around the pin 26 and interposed between the bottom of a chamber 30 formed in the thimble and a shoulder 31 on the pin 26. The heelpart of the sole is marked by a knife-edge 32 which is carried by a block 33 secured to the underside of the bar 23. This block 33 is engaged by a pin 34 which is provided on its upper end with a head 35.

Figure 3:
Fig. 3 is a plan of the marked sole.

When it is desired to mark the sole the bar 23 is elevated into a vertical position to permit the sole to be positioned between the plates 5 and 6. The bar is then returned to a horizontal position. By striking the pins 26 and 35 with a hammer the sole is marked in the manner shown in Fig. 3. After the sole is marked it is secured to the bottom of a last in the usual manner and the last is then secured to a jack 36, (Fig. 5).

This jack is provided with a spindle 37 and a saddle 38. The spindle 37 is secured to a boss 39 carried by two vertical plates 40 rising from a base 41. The saddle 38 consists of a pad of yielding material mounted upon the upper end of a chambered post 42. The post 42 is mounted in a standard 43 and is guided to slide vertically therein by a screw 44 which is arranged to engage a slot 45 formed in the post 42. The saddle 38 is normally held elevated by a coiled spring 46 which is interposed between the bottom of the standard 43 and the top of the chamber in the post 42. To permit the saddle to be forced upwardly the post 42 carries a rack 47 which, when the saddle is under the influence of the spring 46, registers with an opening 48 formed in a worm 49. This worm is mounted in a housing 50 on a vertical shaft 51 journaled on the standard 43 and is provided with a handle 52 by means of which the operative may engage the worm with the rack 47 and force the saddle 38 upwardly to jack the shoe. To permit the jack to accommodate different sizes of shoes the standard 43 is mounted to slide on ways 53 formed on the plates 40.

After the last has been jacked the jack is placed upon the top of the leader. To this end the leader is provided with a pair of buttonhole slots 54, (Fig. 4) which receive headed bolts 55, (Fig. 5) carried by the base 41 of the jack. With this construction the jack may be placed upon the leader by passing the heads of the bolts 55 through the large ends of the buttonhole slots 54. The jack is then shifted on the leader until the marks on the sole are positioned beneath a pair of pointers 56 carried by an arm 57 which is pivotally mounted upon a pair of standards 58 carried by the holder 9. The pointers 56 are each formed on the end of a vertical pin 59 and are normally held under spring tension by a spring 60 coiled around the rod 59 and interposed between a shoulder on the rod and the arm 57. Movement of the pointers under the influence of their springs is limited by pins 61 carried by the upper ends of the rod 59. The arm 57 is arranged to have a horizontal operative position and a vertical inoperative position and is held in these positions respectively by lugs 62 and 63 carried by the arm 57 and arranged to engage opposite sides of one of the standards 58. As the pointers 56 have the same relation to the leader as the marks have to the sole it will be apparent that when the marks register with the pointers that the lateral curves of the edge of the sole are alined with the corresponding lateral curves of the leader. In other words, the marks made on the sole bear the same relationship to given points on the contour of the sole (for instance, the points which are engaged by the sole clamping devices) that the pointers bear to homologous points on the contour of the leader. Consequently, if the work is moved to register said marks with the pointers the projection of the sole shaped outline or contour of the work upon the plane of the leader must be concentric with the outline or contour of the leader. Shifting movement of the jack in the manner described brings the shanks of the bolts within the small ends of the buttonhole slots 54. To clamp the jack to the leader the ends of the shanks of the bolts are provided with pins 64 which are engaged by the opposite ends of a leaf spring 65 arranged to embrace the shanks of the bolts. The spring is positioned to exert clamping pressure upon the bolts and thus clamp the end of the leader by a triangular cam 66 secured to a shaft 67 journaled in the plates and actuated through a handle 68 carried by the shaft. The base 41 carries a pair of pins 69 which act as fulcrums for the leaf spring 65 during the bowing thereof.

When it is desired to place a new sole into the machine a leader having the same contour as the sole is placed in the holder 9 the pointers 56 at that time being elevated into their inoperative position. The sole is also placed in the holder 3 and marked in the manner illustrated in Fig. 3. The marked sole is then secured to the bottom of a last in the usual manner. The last is then secured to a jack. The jack is then placed upon the leader by passing the heads of the bolts 55 through the buttonhole slots 54 in the leader. The pointers 56 are then placed in their operative position after which the jack is shifted on the leader until the marks on the sole register with the pointers 56 when the handle 68 is actuated to clamp the jack to the leader. The leader and attached jack are then removed from the holder and placed in position in the automatic machine.

While the invention has been illustrated and described in connection with automatic shoe machines it will be apparent that it may be equally useful in connection with other kinds of automatic machines. It will also be understood that while the apparatus herein shown and described is well adapted for the purpose of carrying out the method of the present invention, the practice of the invention is not limited to this apparatus or to any other specific form of apparatus but that a great variety of mechanisms and apparatus may be used in successfully practising the invention.

What is claimed as new, is:

1. The method of positioning work having lateral reverse curves thereon relatively to the operating tools of an automatic machine in which the relative traverse of the work and tools is controlled by a leader having lateral reverse curves corresponding in direction and extent to the curves of the work, said method consisting in marking the work and then bringing the corresponding curves of the marked work and leader into alinement by registering the marks on the work with pointers having the same relation to the leader as the marks have to the work, substantially as described.

2. The method of positioning work having lateral reverse curves thereon relatively to the operating tools of an automatic machine in which the relative traverse of the work and tools is controlled by a leader having lateral reverse curves corresponding in direction and extent to the curves of the work, said method consisting in clamping the work and leader at separated points, marking the clamped work, and bringing the corresponding curves of the marked work and leader into alinement by registering the marks on the work with pointers having the same relation to the clamped leader as the marks have to the work, substantially as described.

3. The method of positioning a sole relatively to the operating tools of an automatic machine in which the relative traverse of the sole and tools is controlled by a leader having lateral reverse curves corresponding in direction and extent to the curves of the sole, said method consisting in clamping the sole and leader separately, marking the clamped sole, securing the sole to a work support, and bringing the work support and leader into alinement by registering the marks on the sole with pointers having the same relation to the clamped leader as the marks have to the sole, substantially as described.

4. The method of positioning a sole relatively to the operating tools of an automatic machine in which the relative traverse of the sole and tools is controlled by a leader having lateral reverse curves corresponding in direction and extent to the curves of the sole, said method consisting in clamping the sole and the leader separately, marking the clamped sole, securing the sole to a work support, bringing the work support and leader into alinement by shifting the work support on the leader until the marks on the sole register with pointers having the same relation to the clamped leader as the marks have to the sole, and clamping the work support to the leader when the marks and pointers register, substantially as described.

5. The method of positioning work having a contour like the outline of a shoe sole with reference to a leader having a similar contour, which method consists in marking the work at separated places bearing a definite relationship to certain points on said contour of the work, and registering the marks so made with devices that bear the same relationship to homologous points on the contour of said leader that said marks bear to said points on the contour of the work.

6. The method of positioning a sole located on a last, having a bottom curved laterally and longitudinally on a flat leader support therefor to bring the projected contour of the sole upon the plane of the leader into concentric relationship to the outline of the leader, which method consists in making marks on the sole at widely separated places bearing a definite relationship to certain points on said contour of the sole, and then registering said marks with devices that bear the same relationship to homologous points on the contour of the said leader that said marks bear to said points on the contour of the sole.

7. The method of positioning work having a contour like the outline of a shoe sole with reference to a leader having a similar contour, which method consists in making marks on the work at places bearing a predetermined relationship to points on said contour, gaging the position of the leader, and registering said marks with pointers bearing the same relationship to the gaged leader that said marks bear to the work.

MARK E. FERNALD.

Witnesses:
WILLIAM F. TORREY,
CATHERINE L. SULLIVAN.